(12) United States Patent
Bauer et al.

(10) Patent No.: US 11,739,195 B2
(45) Date of Patent: Aug. 29, 2023

(54) ADDITIVE MIXTURES FOR PLASTICS, LASER-MARKABLE POLYMER COMPOSITIONS COMPRISING THEM AND THE USE THEREOF

(71) Applicant: CLARIANT PLASTICS & COATINGS LTD, Muttenz (CH)

(72) Inventors: Harald Bauer, Kerpen (DE); Sebastian Hörold, Diedorf (DE); Martin Sicken, Cologne (DE)

(73) Assignee: Clariant International Ltd, Muttenz (CH)

( * ) Notice: Subject to any disclaimer, the term of this patent is extended or adjusted under 35 U.S.C. 154(b) by 268 days.

(21) Appl. No.: 16/630,502

(22) PCT Filed: Jul. 6, 2018

(86) PCT No.: PCT/EP2018/068322
§ 371 (c)(1),
(2) Date: Jan. 13, 2020

(87) PCT Pub. No.: WO2019/011791
PCT Pub. Date: Jan. 17, 2019

(65) Prior Publication Data
US 2020/0165415 A1 May 28, 2020

(30) Foreign Application Priority Data
Jul. 14, 2017 (DE) ...................... 10 2017 212 099.1

(51) Int. Cl.
| | | |
|---|---|---|
| C08K 5/5313 | (2006.01) | |
| C08K 3/105 | (2018.01) | |
| C08K 3/11 | (2018.01) | |
| C08K 3/32 | (2006.01) | |
| C08K 5/3492 | (2006.01) | |
| C08K 7/14 | (2006.01) | |

(52) U.S. Cl.
CPC ............ *C08K 5/5313* (2013.01); *C08K 3/105* (2018.01); *C08K 3/11* (2018.01); *C08K 3/32* (2013.01); *C08K 5/34928* (2013.01); *C08K 7/14* (2013.01); *C08K 2003/321* (2013.01)

(58) Field of Classification Search
None
See application file for complete search history.

(56) References Cited

U.S. PATENT DOCUMENTS

| | | |
|---|---|---|
| 3,692,744 A | 9/1972 | Rich et al. |
| 3,900,444 A | 8/1975 | Racky et al. |
| 4,036,811 A | 7/1977 | Noetzel et al. |
| 5,773,556 A | 6/1998 | Kleiner et al. |
| 6,207,736 B1 | 3/2001 | Nass et al. |
| 6,509,401 B1 | 1/2003 | Jenewein et al. |
| 7,420,007 B2 | 9/2008 | Bauer et al. |
| 7,737,201 B2 | 6/2010 | Futterer et al. |
| 7,771,646 B2 | 8/2010 | Clauss et al. |
| 7,927,710 B2 | 4/2011 | Hewel |

(Continued)

FOREIGN PATENT DOCUMENTS

| | | |
|---|---|---|
| CN | 1660857 A | 8/2005 |
| CN | 101068884 A | 11/2007 |

(Continued)

OTHER PUBLICATIONS

Taiwanese Office Action dated Oct. 27, 2021 issued in Taiwanese Patent Application No. 107123459.
First Examination Report, dated Apr. 23, 2021, in Indian Application No. 202017001616 (6 pages).
International Search Report (with partial translation) and Written Opinion dated Oct. 10, 2018, issued in corresponding International Patent Application No. PCT/EP2018/068322.
Office Action dated Mar. 10, 2020, issued in corresponding Chinese Patent Application No. 201711448811.8.
First Office Action, dated Oct. 11, 2017, issued in corresponding German Patent Application No. 102017212099.1.

(Continued)

*Primary Examiner* — Robert T Butcher
(74) *Attorney, Agent, or Firm* — Morgan, Lewis & Bockius LLP

(57) ABSTRACT

The invention relates to additive mixtures for plastics containing phosphinic acid of the formula (I) as component A,

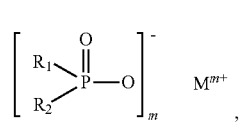

(I)

wherein $R_1$ and $R_2$ mean ethyl, M is Al, Fe, $TiO_p$ or Zn, m means 2 to <4, preferably 2 or 3, and $p=(4-m)/2$ is a compound selected from the group of Al, Fe, $TiO_p$ or Zn salts of ethylbutylphosphinic acid, dibutylphosphinic acid, ethylhexylphosphinic acid, butylhexylphosphinic acid and/or dihexylphosphinic acid as component B, phosphonic acid salt of formula (II) as component C,

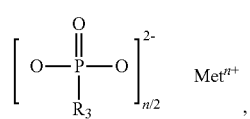

(II)

wherein $R_3$ means ethyl, Met is Al, Fe, $TiO_q$ or Zn, n means 2 to 3, and $q=(4-n)/2$, and antimony, tin and/or indium as component D. Polymer compositions containing said additive mixtures are characterized by exceptional flame protection and by very good laser markability or laser weldability.

16 Claims, No Drawings

(56) References Cited

U.S. PATENT DOCUMENTS

| | | | |
|---|---|---|---|
| 8,754,154 | B2 | 6/2014 | Dave et al. |
| 9,403,996 | B2 | 8/2016 | Rueger et al. |
| 10,344,145 | B2 | 7/2019 | Rueger et al. |
| 10,421,909 | B2 | 9/2019 | Bauer et al. |
| 10,508,238 | B2 | 12/2019 | Bauer et al. |
| 2006/0074157 | A1* | 4/2006 | Bauer .................... C07F 9/301 524/115 |
| 2006/0226404 | A1 | 10/2006 | Bauer et al. |
| 2007/0173581 | A1 | 7/2007 | Hager et al. |
| 2008/0269384 | A1 | 10/2008 | Naegerl et al. |
| 2009/0048373 | A1 | 2/2009 | Clauss et al. |
| 2012/0292295 | A1 | 11/2012 | Edler et al. |
| 2013/0190432 | A1 | 7/2013 | Krause et al. |
| 2015/0005427 | A1* | 1/2015 | Bauer .................... C09K 21/04 524/415 |
| 2016/0177060 | A1 | 6/2016 | Endtner et al. |
| 2016/0264774 | A1 | 9/2016 | Bienmueller et al. |
| 2016/0368936 | A1 | 12/2016 | Yao et al. |
| 2018/0016412 | A1 | 1/2018 | Wanzke et al. |
| 2018/0223115 | A1* | 8/2018 | Kniess .................... C08J 3/226 |
| 2018/0273730 | A1 | 9/2018 | Rueger et al. |

FOREIGN PATENT DOCUMENTS

| | | |
|---|---|---|
| CN | 103102367 A | 5/2013 |
| CN | 104371142 A | 2/2015 |
| CN | 105367823 A | 3/2016 |
| DE | 1900270 A1 | 11/1969 |
| DE | 2252258 A1 | 5/1974 |
| DE | 2447727 A1 | 4/1976 |
| DE | 19607635 A1 | 9/1997 |
| DE | 19734437 A1 | 2/1999 |
| DE | 19737727 A1 | 7/1999 |
| DE | 10359814 A1 | 7/2005 |
| DE | 102004010504 A1 | 9/2005 |
| DE | 102004051457 A1 | 9/2005 |
| DE | 102004050478 A1 | 4/2006 |
| DE | 102004050555 A1 | 4/2006 |
| DE | 102004050557 A1 | 4/2006 |
| DE | 102004050571 A1 | 4/2006 |
| DE | 102005016195 A1 | 10/2006 |
| DE | 102007036465 A1 | 2/2009 |
| DE | 102010052888 A1 | 6/2012 |
| DE | 102011120218 A1 | 6/2013 |
| DE | 102014001222 A1 | 7/2015 |
| DE | 102014016286 A1 | 5/2016 |
| DE | 102015009854 A1 | 2/2017 |
| EP | 1544206 B1 | 6/2005 |
| EP | 1710275 B1 | 10/2006 |
| EP | 1095030 B1 | 8/2007 |
| EP | 1720712 B1 | 9/2008 |
| EP | 1988113 A1 | 11/2008 |
| EP | 1377522 B1 | 6/2010 |
| EP | 1789475 B1 | 7/2010 |
| EP | 3034553 A1 | 6/2016 |
| EP | 3133112 A1 | 2/2017 |
| JP | 2004-204194 A | 7/2004 |
| JP | 2005-179360 A | 7/2005 |
| JP | 2008-517082 A | 5/2008 |
| JP | 2011-084666 A | 4/2011 |
| JP | 2011-148917 A | 8/2011 |
| JP | 2012-514681 A | 6/2012 |
| JP | 2017-513817 A | 6/2017 |
| WO | 2000/002869 A1 | 1/2000 |
| WO | 2002/28953 A1 | 4/2002 |
| WO | 2006/027340 A1 | 3/2006 |
| WO | 2006/090751 A1 | 8/2006 |
| WO | 2011/085779 A1 | 7/2011 |
| WO | 2012/045414 A1 | 4/2012 |
| WO | 2016/065971 A1 | 5/2016 |
| WO | 2016/070954 A1 | 5/2016 |

OTHER PUBLICATIONS

Second Office Action, dated Feb. 4, 2020, issued in corresponding German Patent Application No. 102017212099.1.

Office Action dated Sep. 30, 2021, issued in corresponding European Patent Application No. 18739831.8.

Office Action dated Mar. 2, 2022, issued in corresponding Japanese Patent Application No. 2020-500698.

Office Action dated Nov. 23, 2022, issued in corresponding Korean Patent Application No. 10-2020-7004487.

* cited by examiner

ADDITIVE MIXTURES FOR PLASTICS, LASER-MARKABLE POLYMER COMPOSITIONS COMPRISING THEM AND THE USE THEREOF

The present invention relates to novel additive mixtures and to flame-retardant and laser-markable for laser-weldable polymer compositions comprising them, and to the use of these compositions.

Combustible plastics generally have to be equipped with flame retardants in order to be able to attain the high flame retardancy demands made by the plastics processors and in some cases by the legislator. Preferably—for environmental reasons as well—nonhalogenated flame retardant systems that form only a low level of smoke gases, if any, are used.

Among these flame retardants, the salts of phosphinic acid (phosphinates) have been found to be particularly effective for thermoplastic polymers (DE 2 252 258 A and DE 2 447 727 A).

In addition, there are known synergistic combinations of phosphinates with particular nitrogen-containing compounds which have been found to be more effective as flame retardants in a whole series of polymers than the phosphinates alone (WO-2002/28953 A1, and also DE 197 34 437 A1 and DE 197 37 727 A1).

U.S. Pat. No. 7,420,007 B2 discloses that dialkylphosphinates containing a small amount of selected telomers as flame retardant are suitable for polymers, the polymer being subject only to quite a minor degree of degradation on incorporation of the flame retardant into the polymer matrix.

Flame retardants frequently have to be added in high dosages in order to ensure sufficient flame retardancy of the plastic according to international standards. Due to their chemical reactivity, which is required for flame retardancy at high temperatures, flame retardants, particularly at higher dosages, can impair the processing stability of plastics. This may result in increased polymer degradation, crosslinking reactions, outgassing or discoloration.

The addition of additives that impart a particular property to the plastic molding is also sufficiently well-known. For instance, there are known laser-activatable additives for imparting laser markability or laser weldability to plastics. These additives are based, for example, on nanoscale metal oxides that have been doped with laser-sensitive additions. Examples of laser-activatable metal oxides are nanoscale indium tin oxide or nanoscale antimony tin oxide. Laser-activatable plastic compositions are described, for example, in DE 10 2004 010 504 A1, DE 10 2004 050555 A1, DE 10 2004 050 557 A1, DE 10 2004 050 571 A1, DE 10 2004 051 457 A1, DE 10 2010 052 888 A1, DE 10 2014 016 286 A1 and DE 10 2015 009 854 A1.

In many branches of industry, the identification of production goods is becoming increasingly important. Frequently, production data, batch numbers, use-by dates, barcodes, 2D codes, company logos or serial numbers have to be applied to plastic parts. In this context, contactless, very rapid and flexible marking with lasers is gaining in significance. It is thus possible to apply inscriptions at high speed even to a non-planar surface. Since the inscription is within the plastic body itself, it is permanently abrasion-resistant.

Since many plastics are transparent to laser light, agents that are usually laser-sensitive are added to the plastics, which cause a local, readily visible change in color as a result of absorption of the laser energy in the plastic material either directly through interaction with the polymer or indirectly with an added material. The laser-sensitive agent may be an organic dye or a pigment which absorbs laser light. There may be various causes for the change in color, for example the breakdown of the polymer, or the absorber itself is converted from an invisible to a visible form. In general, the plastic is darkened through carbonization as a result of the laser energy introduced.

Numerous additives are known for the laser marking of plastics. Suitable materials for marking with Nd-YAG lasers or with $YVO_4$ lasers are preferably those that absorb light of wavelength 1064 nm and themselves have only low intrinsic color. Examples are copper phosphates, bismuth oxide, bismuth oxychloride, antimony-doped tin oxide on mica or metals. EP 1 377 522 A2 describes additives for the laser marking of plastics which consist of calcined mixed antimony-tin oxide in which the antimony concentration at the surface is higher than in the particles as a whole. The particle size is 0.1-10 μm. The additive gives dark-colored markings on light-colored backgrounds. It is not possible to produce light-colored markings.

EP 1 720 712 A1 discloses high-transparency laser-markable and laser-weldable plastic materials comprising doped tin oxides, antimony oxides or indium oxides having a particle size of 1-100 nm. The transparency thereof at a thickness of 2 mm is more than 85%, and they have only low levels of haze.

WO 2011/085779 A1 describes materials and processes for production of a light-colored laser marking. This is done using particles that consist of a white core and a preferably black or gray shell that can be discolored by laser irradiation. The dark shell comprises carbon, for example in the form of carbon black. The materials described in this document have the disadvantage that they are dark gray to black and hence the color configuration of the plastic parts is significantly restricted.

DE 10 2014 016 286 A1 describes laser additives which, especially on colored or dark backgrounds, through laser exposure, lead to a light-colored to white marking which is conserved over a long period even under mechanical stress.

What have now been found, surprisingly, are additive mixtures for plastics based on selected phosphinates which, in combination with selected laser-activatable additions, impart very good electrical values, excellent flame retardancy and high sensitivity in laser marking or laser welding to polymer compositions.

It was therefore an object of the present invention to provide additive mixtures based on phosphinate-containing flame retardancy systems which simultaneously impart all the aforementioned properties to polymers, such as good electrical values (GWFI, GWIT, CTI), high flame retardancy, characterized by minimum afterflame times (UL 94, time), and good laser markability.

The invention provides additive mixtures for plastics, comprising phosphinic salt of the formula (I) as component A

in which $R_1$ and $R_2$ are ethyl,
M is Al, Fe, $TiO_p$ or Zn,
m is 2 to 3, preferably 2 or 3, and $p=(4-m)/2$ compound selected from the group of the Al, Fe, $TiO_p$ and Zn salts of ethylbutylphosphinic acid, of dibutylphosphinic acid, of ethylhexylphosphinic acid, of butylhexylphosphinic acid and/or of dihexylphosphinic acid as component B
phosphonic salt of the formula (II) as component C

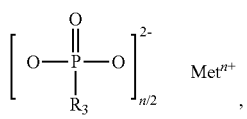

(II)

in which $R_3$ is ethyl,
Met is Al, Fe, $TiO_q$ or Zn,
n is 2 to 3, preferably 2 or 3, and $q=(4-n)/2$, and antimony, tin and/or indium as component D.

In the additive mixtures of the invention, the proportion of component A is typically 5% to 85% by weight, preferably 10% to 60% by weight.

In the additive mixtures of the invention, the proportion of component B is typically 0.01% to 10% by weight, preferably 0.1% to 2.5% by weight.

In the additive mixtures of the invention, the proportion of component C is typically 0.01% to 10% by weight, preferably 0.1% to 2.5% by weight.

In the additive mixtures of the invention, the proportion of component D is typically 0.0001% to 3% by weight, preferably 0.1% to 2% by weight.

These percentages for the proportions of components A to E are based on the total amount of the additive mixtures.

Preference is given to additive mixtures in which
the proportion of component A is 5% to 85% by weight,
the proportion of component B is 0.01% to 10% by weight,
the proportion of component C is 0.01% to 10% by weight, and
the proportion of component D is 0.0001% to 3% by weight,
where the percentages are based on the total amount of the additive mixtures.

Particular preference is given to additive mixtures in which
the proportion of component A is 10% to 60% by weight,
the proportion of component B is 0.1% to 2.5% by weight,
the proportion of component C is 0.1% to 2.5% by weight, and
the proportion of component D is 0.1% to 2% by weight.

Salts of component A that are used with preference are those in which $M^{m+}$ is $Zn^{2+}$, $Fe^{3+}$ or especially $Al^{3+}$.

Salts of component B that are used with preference are zinc, iron or especially aluminum salts.

Salts of component C that are used with preference are those in which $Met^{n+}$ is $Zn^{2+}$, $Fe^{3+}$ or especially $Al^{3+}$.

Very particular preference is given to additive mixtures in which M and Met are Al, m and n are 3, and in which the compounds of component B take the form of aluminum salts.

The salts of diethylphosphinic acid used as component A in accordance with the invention are known flame retardants for polymeric molding compounds.

Salts of diethylphosphinic acid with proportions of the phosphinic and phosphonic salts used in accordance with the invention as component B and C are also known flame retardants. The production of this combination of substances is described, for example, in U.S. Pat. No. 7,420,007 B2.

The salts of diethylphosphinic acid of component A that are used in accordance with the invention may contain small amounts of salts of component B and/or salts of component C, for example up to 10% by weight of component B, preferably 0.01% to 6% by weight, and especially 0.2% to 2.5% by weight thereof, and up to 10% by weight of component C, preferably 0.01% to 6% by weight, and especially 0.2% to 2.5% by weight thereof, based on the amount of components A, B and C.

The salts of ethylphosphonic acid used in accordance with the invention as component C are likewise known as additions to diethylphosphinates in flame retardants for polymeric molding compounds, for example from WO 2016/065971 A1.

Preference is given to additive mixtures comprising, as component D, 0.0001% to 2.6% by weight of antimony, preferably 0.17% to 1.7% by weight of antimony, and/or 0.0001% to 1.5% by weight of tin, preferably 0.1% to 1% by weight of tin, and/or 0.0001% to 1.5% by weight of indium, preferably 0.1% to 1% by weight of indium.

Preferably, component D comprises antimony- or fluorine-doped tin oxide, indium tin oxide and/or antimony oxide.

The use of the antimony- or fluorine-doped tin oxides or of indium tin oxide used in accordance with the invention as component D for applications in laser marking or laser welding is known. For instance, DE 10 2014 016 286 A1 discloses colored laser-markable and laser-weldable polymeric materials comprising, as absorber, at least one doped tin oxide or indium oxide having a high specific surface area.

The doped tin oxide used in accordance with the invention as component D can be used as such, for example in the form of particles having high specific surface area, as described in DE 10 2014 016 286 A1. Alternatively, the doped tin oxide can be applied to a support, for example to a metal oxide, especially to titanium dioxide, as described in DE 10 2015 009854 A1.

Preferred components D are fluorine- or antimony-doped tin oxide or indium tin oxide, the particles of which have a specific surface area determined according to BET of at least 15 $m^2$/g, preferably at least 20 $m^2$/g. Particular preference is given to particles having a specific surface area of at least 25 $m^2$/g.

The laser pigments having high specific surface area that are used with preference in accordance with the invention as component D, in the simplest case, may consist of nanoscale particles having correspondingly high specific surface area. "Nanoscale" here means a diameter of <100 nm. Preferably, the pigments used in accordance with the invention as component D, however, consist of larger porous aggregates of primary particles that may be nanoscale. On incorporation into the flame retardant combination or into the plastic, the aggregates are partly broken down by the shear forces, but not down to the primary particles.

Further preferred components D are with support particles coated with fluorine- or antimony-doped tin oxide or with indium tin oxide. Preference is given to using titanium dioxide particles as support particles. The mass-weighted particle size of the coated support particles is preferably not more than 10 μm, especially not more than 4 μm, measured as the $D_{95}$ by means of laser diffraction.

Particularly preferred components D are $TiO_2$ particles surface-coated with an antimony-doped tin dioxide layer and having a number-weighted particle size of <15 μm, measured using the $D_{95}$ by means of laser diffraction. In this context, the antimony-doped tin dioxide layer acts as absorber for the laser energy. Under laser exposure, the $TiO_2$ in the laser additive is reduced to $Ti_xO_y$, which is notable for a dark color.

Laser additives used with preference as component D are antimony-doped tin oxide, fluoride-doped tin oxide and indium tin oxide, where the content of dopants in the tin oxide is 1-15 mol %, preferably 3-10 mol %. The indium tin oxide preferably contains 5-15 mol % of tin.

Laser additives used with particular preference as component D are antimony-doped tin oxide containing 0.0001-2.6% by weight of antimony, preferably 0.17-1.7% by weight of antimony, and/or 0.0001-1.5% by weight of tin, preferably 0.1-1% by weight of tin.

Further laser additives used with particular preference as component D are indium tin oxide containing 0.0001-1.5% by weight of indium, preferably 0.1-1% by weight of indium, and/or 0.0001-1.5% by weight of tin, preferably 0.1-1% by weight of tin.

A very particularly preferred component D is tin dioxide/diantimony trioxide-coated mica containing 15-30% by weight of tin and 0.3-2% by weight of antimony.

A likewise particularly preferred component D is antimony oxide.

Further suitable components D or sources of component D are $Sb_2O_3$, indium oxide, indium tin oxide (0.9 $In_2O_3$*0.1 $SnO_2$), tinstone, cassiterite, antimony-containing tin oxide, copper(II) hydroxide phosphate/antimony(III) phosphate mixtures, tin-containing metal oxides, tin oxide-coated mica, indium(III) oxide, indium(III) hydroxide, tin antimonate, indium antimonide, potassium antimonate, sodium antimonate, antimony phosphate, antimony pyrophosphate, antimony polyphosphate, antimony hydrogenphosphite ((SbO)$H_2PO_3$), zinc stannate, zinc hydroxystannate, tin(II) oxalate (tin content 0.02-3.8%), tin phosphate, tin pyrophosphate and tin polyphosphate.

The laser pigments used in accordance with the invention can be obtained even by means of suitable process parameters in the course of production in the form of finely divided powder of high specific surface area and having particle sizes of 10 μm or less. Alternatively, it is possible to grind larger particles or larger aggregates to the desired particle size with the aid of suitable mills, for example air jet mills and/or bead mills.

In a preferred embodiment, the additive mixtures of the invention comprise, as well as components A, B, C and D, additionally a colorant E.

The colorant E serves to enhance the contrast of the color change caused by the laser additive E. Without any colorant E, the plastic has a light-colored and transparent to opaque appearance. Light-colored markings are obtained even without colorant E in the presence of the laser additives D used in accordance with the invention and with use of suitable exposure parameters, but these are frequently difficult to see against the background owing to the low contrast.

Preferred colorants E are those that themselves absorb only very little light or preferably none at all at the wavelength of the laser light. Suitable colorants F are especially organic dyes and pigments, a large number of which are available to the person skilled in the art.

Preferred colorants E permit broad color variations, particularly in the colors of red, green and blue. Suitable colorants E are especially organic pigments and dyes.

In the additive mixtures of the invention, the proportion of component E is typically between 0% and 30% by weight, preferably 1% to 20% by weight, based on the total amount of the additive mixtures.

In a further preferred embodiment, the additive mixture of the invention comprises, as component F, an inorganic phosphonate.

The use of the inorganic phosphonates used in accordance with the invention as component F or else of salts of phosphorous acid (phosphites) as flame retardants is known. For instance, WO 2012/045414 A1 discloses flame retardant combinations comprising, as well as phosphinic salts, also salts of phosphorous acid (=phosphites).

Preferably, the inorganic phosphonate (component F) conforms to the general formula (IV) or (V)

in which Kat is a p-valent cation, especially a cation of an alkali metal or alkaline earth metal, an ammonium cation and/or a cation of Fe, Zn or especially of Al, including the cations Al(OH) or Al(OH)$_2$, and p is 1, 2, 3 or 4.

Preferably, the inorganic phosphonate (component F) is aluminum phosphite [Al(H$_2$PO$_3$)$_3$], secondary aluminum phosphite [Al$_2$(HPO$_3$)$_3$], basic aluminum phosphite [Al(OH)(H$_2$PO$_3$)$_2$+2aq], aluminum phosphite tetrahydrate [Al$_2$(HPO$_3$)$_3$*4aq], aluminum phosphonate, Al$_7$(HPO$_3$)$_9$(OH)$_6$(1,6-hexanediamine)$_{1.5}$+12H$_2$O, Al$_2$(HPO$_3$)$^3$*xAl$_2$O$_3$*nH$_2$O where x=2.27–1 and/or Al$_4$H$_6$P$_{16}$O$_{18}$.

The inorganic phosphonate (component F) preferably also comprises aluminum phosphites of the formulae (VI), (VII) and/or (VIII)

where q is 0 to 4,

where M represents alkali metal cations, z is 0.01 to 1.5 and y is 2.63 to 3.5 and v is 0 to 2 and w is 0 to 4;

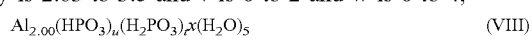

where u is 2 to 2.99 and t is 2 to 0.01 and s is 0 to 4, and/or aluminium phosphite [Al(H2PO$_3$)$_3$], secondary aluminum phosphite [Al$_2$(HPO$_3$)$_3$], basic aluminum phosphite [Al(OH)(H$_2$PO$_3$)$_2$*2aq], aluminum phosphite tetrahydrate [Al$_2$(HPO$_3$)$_3$*4aq], aluminum phosphonate, Al$_7$(HPO$_3$)$_9$(OH)$_6$(1,6-hexanediamine)$_{1.5}$*12H$_2$O, Al$_2$(HPO$_3$)$^3$*xAl$_2$O$_3$*nH$_2$O where x=2.27–1 and/or Al$_4$H$_6$P$_{16}$O$_{18}$.

Preferred inorganic phosphonates (component F) are salts that are insoluble or sparingly soluble in water.

Particularly preferred inorganic phosphonates are aluminum, calcium and zinc salts.

More preferably, component F is a reaction product of phosphorous acid and an aluminum compound.

Particularly preferred components F are aluminum phosphites having CAS numbers 15099-32-8, 119103-85-4, 220689-59-8, 56287-23-1, 156024-71-4, 71449-76-8 and 15099-32-8.

The aluminum phosphites used with preference are prepared by reaction of an aluminum source with a phosphorus source and optionally a template in a solvent at 20-200° C. over a period of time of up to 4 days. For this purpose, aluminum source and phosphorus source are mixed for 1-4 h, heated under hydrothermal conditions or at reflux, filtered off, washed and dried, for example at 110° C.

Preferred aluminum sources are aluminum isopropoxide, aluminum nitrate, aluminum chloride, aluminum hydroxide (e.g. pseudoboehmite).

Preferred phosphorus sources are phosphorous acid, (acidic) ammonium phosphite, alkali metal phosphites or alkaline earth metal phosphites.

Preferred alkali metal phosphites are disodium phosphite, disodium phosphite hydrate, trisodium phosphite, potassium hydrogenphosphite.

A preferred disodium phosphite hydrate is Brüggolen® H10 from Brüggemann.

Preferred templates are 1,6-hexanediamine, guanidine carbonate or ammonia.

A preferred alkaline earth metal phosphite is calcium phosphite.

The preferred ratio of aluminum to phosphorus to solvent is 1:1:3.7 to 1:2.2:100 mol. The ratio of aluminum to template is 1:0 to 1:17 mol. The preferred pH of the reaction solution is 3 to 9. A preferred solvent is water.

In the application, particular preference is given to using the same salt of phosphinic acid as of phosphorous acid, i.e., for example, aluminum diethylphosphinate together with aluminum phosphite or zinc diethylphosphinate together with zinc phosphite.

In a preferred embodiment, the above-described additive mixtures comprise, as component F, a compound of the formula (III)

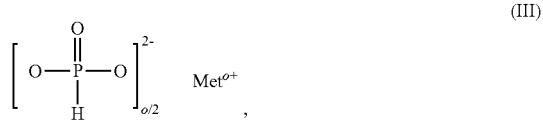

in which Me is Fe, TiO$_r$, Zn or especially Al,
o is 2 to 3, preferably 2 or 3, and $r=(4-o)/2$.

Compounds of the formula III that are used with preference are those in which Me$^{o+}$ is Zn$^{2+}$, Fe$^{3+}$ or especially Al$^{3+}$.

In the additive mixtures of the invention, the proportion of component F is typically between 0% and 50% by weight, preferably 0.01% to 50% by weight, especially 0.02% to 25% by weight, based on the total amount of the additive mixtures.

In a further preferred embodiment, components A, B and C and optionally F are in particulate form, where the median particle size (d$_{50}$) is 1 to 100 μm.

In a further preferred embodiment, the additive mixture of the invention comprises, as component I, a melamine polyphosphate having an average degree of condensation of not less than 20.

The use of the polyphosphate derivatives of melamine having a degree of condensation of not less than 20 that are used in accordance with the invention as component I as flame retardants is known. For instance, DE 10 2005 016 195 A1 discloses a stabilized flame retardant comprising 99% to 1% by weight of melamine polyphosphate and 1% to 99% by weight of additive with reserve alkalinity. This document also discloses that this flame retardant can be combined with a phosphinic acid and/or a phosphinic salt.

Preferred additive mixtures of the invention comprise, as component I, a melamine polyphosphate having an average degree of condensation of 20 to 200, especially of 40 to 150.

Further preferred additive mixtures of the invention comprise, as component I, a melamine polyphosphate having a breakdown temperature of not less than 320° C., especially of not less than 360° C. and most preferably of not less than 400° C.

Preference is given to using, as component I, melamine polyphosphates that are known from WO 2006/027340 A1 (corresponding to EP 1 789 475 B1) and WO 2000/002869 A1 (corresponding to EP 1 095 030 B1).

Preference is given to using melamine polyphosphates having an average degree of condensation between 20 and 200, especially between 40 and 150, and having a melamine content of 1.1 to 2.0 mol, especially 1.2 to 1.8 mol, per mole of phosphorus atom.

In another preferred range, the average degree of condensation is 2 to 100.

Preference is likewise given to using melamine polyphosphates having an average degree of condensation (number-average) of >20, the breakdown temperature of which is greater than 320° C., the molar ratio of 1,3,5-triazine compound to phosphorus of which is less than 1.1, especially 0.8 to 1.0, and the pH of a 10% slurry of which in water at 25° C. is 5 or higher, preferably 5.1 to 6.9.

In the additive mixture of the invention, the proportion of component I is typically 0% and 50% by weight, preferably 0.1% to 50% by weight, especially 0.5% to 25% by weight, based on the total amount of the additive mixture.

The invention also relates to the use of the additive mixtures of the invention for rendering laser-markable or laser-weldable thermoplastic and thermoset polymers flame-retardant, and to the polymer compositions that have been rendered flame-retardant and laser-markable or laser-weldable by these additive mixtures. Thermoplastic and/or thermoset polymers (component G hereinafter) comprising the additive mixtures of the invention and optionally fillers and reinforcers and/or other additions, as defined below, are referred to hereinafter as polymer compositions.

The thermoplastic polymers in which the additive mixtures of the invention can be effectively used are amorphous thermoplastic polymers or semicrystalline thermoplastic polymers. Polymers of this kind have already been described in detail in the literature and are known to those skilled in the art.

The thermoplastic polymers used in accordance with the invention include, for example:
1. Polymers of mono- and diolefins, for example polypropylene, polyisobutylene, polybutylene, polybutene-1, polyisoprene or polybutadiene, and addition polymers of cycloolefins, for instance of cyclopentene or of norbornene; and also polyethylene which may optionally have been crosslinked; for example high-density polyethylene (HDPE), high-density polyethylene of high molar mass (HDPE-HMW), high-density polyethylene of ultra-high molar mass (HDPE-UHMW), medium-density polyethylene (MDPE), low-density polyethylene (LDPE), linear low-density polyethylene (LLDPE), branched low-density polyethylene (BLDPE).
2. Mixtures of the aforementioned polymers, for example mixtures of polypropylene with polyisobutylene, polypropylene with polyethylene (e.g. PP/HDPE, PP/LDP) and mixtures of various polyethylene types, for instance LDPE/HDPE.
3. Copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, etc. Also ethylene-alkyl acrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another and with the polymers mentioned under 1., for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

4. Polystyrene, poly(p-methylstyrene), poly-(alpha-methylstyrene).
5. Copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methacrylate; high impact resistance mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.
6. Graft copolymers of styrene or alpha-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates/alkyl methacrylates on polybutadiene, styrene and acrylonitrile on ethylene-propylene-diene terpolymers; styrene and acrylonitrile on polyalkyl acrylates or polyalkyl methacrylates; styrene and acrylonitrile on acrylate-butadiene copolymers, and mixtures thereof with the polymers mentioned under 5., as known, for example, as ABS, MBS, ASA or AES polymers.
7. Halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.
8. Polymers which derive from alpha, beta-unsaturated acids and derivatives thereof, such as polyacrylates and polymethacrylates, polymethylmethacrylates impact-modified with butyl acrylate, polyacrylamides and polyacrylonitriles.
9. Copolymers of the monomers mentioned under 8. with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.
10. Polymers that derive from unsaturated alcohols and amines or from the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with the olefins mentioned under 1.
11. Polyacetals such as polyoxymethylene, and those polyoxymethylenes containing comonomers, for example ethylene oxide; polyacetals modified with thermoplastic polyurethanes, acrylates or MBS.
12. Polyphenylene oxides and sulfides and mixtures thereof with styrene polymers or polyamides.
13. Polyamides and copolyamides which derive from diamines and dicarboxylic acids and/or from aminocarboxylic acids or the corresponding lactams, such as nylon-4, nylon-6, nylon-6/6, 6/10, 6/9, 6/12, 4/6, 12/12, nylon-11, nylon-12; or aromatic polyamides based on m-xylene and adipic acid; polyamides prepared from hexamethylenediamine and iso- and/or terephthalic acid and optionally an elastomer as modifier, for example poly-2,4,4-trimethylhexamethyleneterephthalamide or poly-m-phenyleneisophthalamide; block copolymers of the aforementioned polyamides with polyolefins, olefin copolymers, ionomers, or chemically bonded or grafted elastomers; or with polyethers, for example with polyethylene glycol, polypropylene glycol or polytetramethylene glycol. In addition, EPDM- or ABS-modified polyamides or copolyamides; and polyamides condensed during processing ("RIM polyamide systems").
14. Polyureas, polyimides, polyamideimides, polyetherimides, polyesterimides, polyhydantoins and polybenzimidazoles.
15. Polyesters which derive from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, and block polyether esters which derive from polyethers with hydroxyl end groups; and also polyesters modified with polycarbonates or MBS.
16. Polycarbonates and polyestercarbonates.
17. Polysulfones, polyethersulfones and polyetherketones.
18. Mixtures (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/nylon-6,6 and copolymers.
19. Thermoplastic elastomers (TPEs) such as block copolymers based on styrene (styrene-butadiene block copolymers, styrene-isoprene-styrene block copolymers, styrene-ethylene-butylene-styrene block copolymers), block copolymers based on thermoplastic polyester elastomers, ether-based and/or ester-based block copolymers consisting of alternating blocks of diisocyanates and short-chain diols and of diisocyanates and long-chain diols, polyether-block-amides, copolyamides and/or polyether-amides.

Preferred TPEs are elastomer blends such as thermoplastic olefins containing polypropylene and polyethylene block copolymers; polypropylene and ethylene-propylene rubber, ethylene-octene copolymers, styrene-ethylene-butadienestyrene, polyolefin-ethylene-propylene-dienes, polyolefin-ethylene-vinyl acetate copolymers and/or polyolefin-polyarylene ethers.

Preferred TPEs are thermoplastic vulcanizates, for example ethylene-propylene-diene rubber particles in a matrix of polypropylene.

The thermoset polymers in which the additive mixtures of the invention can be used effectively have likewise already been described in detail in the literature and are known to those skilled in the art.

Preferably, the thermoset polymers comprise unsaturated polyester resins (UP resins) which derive from copolyesters of saturated and unsaturated dicarboxylic acids or anhydrides thereof with polyhydric alcohols, and vinyl compounds as crosslinking agents. UP resins are cured by free-radical polymerization with initiators (e.g. peroxides) and accelerators.

Preferred unsaturated dicarboxylic acids and derivatives for preparation of the UP resins are maleic anhydride and fumaric acid.

Preferred saturated dicarboxylic acids are phthalic acid, isophthalic acid, terephthalic acid, tetrahydrophthalic acid, adipic acid.

Preferred diols are propane-1,2-diol, ethylene glycol, diethylene glycol and neopentyl glycol, neopentyl, ethoxylated or propoxylated bisphenol A.

A preferred vinyl compound for crosslinking is styrene.

Preferred hardener systems are peroxides and metal coinitiators, for example hydroperoxides and cobalt octanoate and/or benzoyl peroxide and aromatic amines and/or UV light and photosensitizers, e.g. benzoin ethers.

Preferred hydroperoxides are di-tert-butyl peroxide, tert-butyl peroctoate, tert-butyl perpivalate, tert-butyl per-2-ethylhexanoate, tert-butyl permaleate, tert-butyl perisobutyrate, benzoyl peroxide, diacetyl peroxide, succinyl peroxide, p-chlorobenzoyl peroxide and dicyclohexyl peroxodicarbonate.

Preferred metal coinitiators are compounds of cobalt, manganese, iron, vanadium, nickel or lead.

Preferred aromatic amines are dimethylaniline, dimethyl-p-toluene, diethylaniline and phenyldiethanolamine.

Further preferred thermoset polymers are epoxy resins which derive from aliphatic, cycloaliphatic, heterocyclic or aromatic glycidyl compounds, for example from bisphenol A diglycidyl ethers and bisphenol F diglycidyl ethers, which are crosslinked by means of customary hardeners and/or accelerators.

Suitable glycidyl compounds are bisphenol A diglycidyl esters, bisphenol F diglycidyl esters, polyglycidyl esters of phenol formaldehyde resins and cresol-formaldehyde resins, polyglycidyl esters of phthalic acid, isophthalic acid and terephthalic acid, and of trimellitic acid, N-glycidyl compounds of aromatic amines and heterocyclic nitrogen bases, and di- and polyglycidyl compounds of polyhydric aliphatic alcohols.

Suitable hardeners are aliphatic, cycloaliphatic, aromatic and heterocyclic amines or polyamines, such as ethylenediamine, diethylenetriamine, triethylenetetramine, propane-1,3-diamine, hexamethylenediamine, aminoethylpiperazine, isophoronediamine, polyamidoamine, diaminodiphenylmethane, diaminodiphenyl ether, diaminodiphenol sulfone, aniline-formaldehyde resins, 2,2,4-trimethylhexane-1,6-diamine, m-xylylenediamine, bis(4-aminocyclohexyl)methane, 2,2-bis(4-aminocyclohexyl)propane, 3-aminomethyl-3,5,5-trimethylcyclohexylamine (isophoronediamine), polyamidoamines, cyanoguanidine and dicyandiamide, and likewise polybasic acids or anhydrides thereof, for example phthalic anhydride, maleic anhydride, tetrahydrophthalic anhydride, methyltetrahydrophthalic anhydride, hexahydrophthalic anhydride and methylhexahydrophthalic anhydride, and also phenols, for example phenol-novolac resin, cresol-novolac resin, dicyclopentadiene-phenol adduct resin, phenol aralkyl resin, cresolaralkyl resin, naphtholaralkyl resin, biphenol-modified phenolaralkyl resin, phenol-trimethylolmethane resin, tetraphenylolethane resin, naphthol-novolac resin, naphthol-phenol cocondensate resin, naphthol-cresol cocondensate resin, biphenol-modified phenol resin and aminotriazine-modified phenol resin. The hardeners can be used alone or in combination with one another.

Suitable catalysts or accelerators for the crosslinking in the polymerization are tertiary amines, benzyldimethylamine, N-alkylpyridines, imidazole, 1-methylimidazole, 2-methylimidazole, 2-ethyl-4-methylimidazole, 2-ethyl-4-methylimidazole, 2-phenylimidazole, 2-heptadecylimidazole, metal salts of organic acids, Lewis acids and amine complex salts.

The thermoset polymers are preferably those which derive from aldehydes on the one hand, and phenols, urea or melamine on the other hand, such as phenol-formaldehyde, urea-formaldehyde and melamine-formaldehyde resins.

Likewise preferably, the thermoset polymers are acrylic resins which derive from substituted acrylic esters, for example from epoxy acrylates, urethane acrylates or polyester acrylates.

Further thermoset polymers used with preference are alkyd resins, polyester resins and acrylate resins which have been crosslinked with melamine resins, urea resins, isocyanates, isocyanurates, polyisocyanates or epoxy resins.

Further thermoset polymers used with preference are polyurethanes or polyureas that have been obtained by reacting polyisocyanates or ureas with polyols or polyamines.

Preferred polyols are alkene oxide adducts of ethylene glycol, propane-1,2-diol, bisphenol A, trimethylolpropane, glycerol, pentaerythritol, sorbitol, sugars or degraded starch. It is also possible to use polyester polyols. These can be obtained by polycondensation of a polyalcohol such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, glucose and/or sorbitol, with a dibasic acid such as oxalic acid, malonic acid, succinic acid, tartaric acid, adipic acid, sebacic acid, maleic acid, fumaric acid, phthalic acid and/or terephthalic acid.

Suitable polyisocyanates are aromatic, alicyclic or aliphatic polyisocyanates having not fewer than two isocyanate groups and mixtures thereof. Preference is given to aromatic polyisocyanates such as tolyl diisocyanate, methylene diphenyl diisocyanate, naphthylene diisocyanates, xylylene diisocyanate, tris(4-isocyanatophenyl)methane and polymethylenepolyphenylene diisocyanates; alicyclic polyisocyanates such as methylene diphenyl diisocyanate, tolyl diisocyanate; aliphatic polyisocyanates and hexamethylene diisocyanate, isophorone diisocyanate, dimeryl diisocyanate, 1,1-methylenebis(4-isocyanatocyclohexane-4,4'-diisocyanatodicyclohexylmethane isomer mixture, 1,4-cyclohexyl diisocyanate, Desmodur® products (Bayer) and lysine diisocyanate and mixtures thereof.

Suitable polyisocyanates are also modified products which are obtained by reaction of polyisocyanate with polyol, urea, carbodiimide and/or biuret.

The polymers used in accordance with the invention as component G are preferably thermoplastic polymers, more preferably HI polystyrene, polyphenylene ethers, polyamides, polyesters, polycarbonates and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) type. HI polystyrene is a polystyrene having elevated impact resistance.

Thermoplastic polymers used with particular preference are PPE/HIPS blends and most preferably polyamides or polyesters.

The additive mixtures used in accordance with the invention give very good stabilization of the polymers (component G) against thermal degradation. This is manifested in the change in the specific viscosity of thermoplastic polymers on compounding and shaping of the polymer compositions of the invention. The thermal stress that occurs therein results in partial degradation of the polymer chains, which is expressed in a reduction in the average molecular weight and in an associated decrease in the viscosity of a polymer solution.

For example, typical values for the specific viscosity of polybutylene terephthalate, measured as a 0.5% by weight solution in phenol/dichlorobenzene (1:1) at 25° C. to ISO 1628 with a capillary viscometer, are about 130 cm$^3$/g. After the compounding and shaping of a polybutylene terephthalate composition of the invention, typical values for the specific viscosity of the polybutylene terephthalate processed (determined as specified above) are in the range between 110 and 129 cm$^3$/g.

Preference is given to using, for the aforementioned use, flame retardant components A to C or A to C and F in a total concentration of 1% to 40% by weight, especially of 3% to 30% by weight, based on the polymer composition.

In the polymer composition of the invention, the proportion of component G is typically 25% to 95% by weight, preferably 25% to 75% by weight.

In the polymer composition of the invention, the proportion of component A is typically 1% to 35% by weight, preferably 5% to 20% by weight.

In the polymer composition of the invention, the proportion of component B is typically 0.01% to 3% by weight, preferably 0.05% to 1.5% by weight.

In the polymer composition of the invention, the proportion of component C is typically 0.001% to 1% by weight, preferably 0.01% to 0.6% by weight.

In the polymer composition of the invention, the proportion of component D is typically 0.005% to 2% by weight, preferably 0.05% to 1% by weight.

In the polymer composition of the invention, the proportion of component E is typically 0% to 25% by weight, preferably 4% to 10% by weight.

In the polymer composition of the invention, the proportion of component F is typically 0% to 10% by weight, preferably 1% to 8% by weight.

In the polymer composition of the invention, the proportion of component I is typically 1% to 25% by weight, preferably 2% to 10% by weight.

These percentages for the proportions of components A to G and I are based on the total amount of the polymer composition.

Preference is given to polymer compositions of the invention that have a comparative tracking index, measured according to International Electrotechnical Commission Standard IEC-60112/3, of not less than 500 volts.

Likewise preferred polymer compositions of the invention attain a V-0 assessment according to UL-94, especially measured on moldings of thickness 3.2 mm to 0.4 mm.

Further preferred polymer compositions of the invention have a glow wire flammability index according to IEC-60695-2-12 of not less than 960° C., especially measured on moldings of thickness 0.75-3 mm.

Even further preferred polymer compositions of the invention have a glow wire ignition temperature (GWIT) according to IEC-60695-2-13 of at least 775° C., preferably of at least 800° C.

The polyamides used with particular preference as component G are generally homo- or copolyamides which derive from (cyclo)aliphatic or aromatic dicarboxylic acids or the polyamide-forming derivatives thereof, such as salts thereof, and from (cyclo)aliphatic or aromatic diamines or from (cyclo)aliphatic or aromatic aminocarboxylic acids or the polyamide-forming derivatives thereof, such as salts thereof.

Useful reactants for polyamides include aliphatic dicarboxylic acids, preferably adipic acid, 2,2,4- and 2,4,4-trimethyladipic acid, azelaic acid and/or sebacic acid, aromatic dicarboxylic acids, preferably isophthalic acid and/or terephthalic acid, aliphatic diamines, preferably tetramethylenediamine, hexamethylenediamine, nonane-1,9-diamine, 2,2,4- and 2,4,4-trimethylhexamethylenediamine, the isomeric diaminodicyclohexylmethanes, diaminodicyclohexylpropanes, bisaminomethylcyclohexane, aromatic diamines, preferably phenylenediamine, aminocarboxylic acids, preferably aminocaproic acid, or the corresponding lactams. Copolyamides formed from two or more of the monomers mentioned are included. Particular preference is given to using caprolactams, very particular preference to using ε-caprolactam.

Preferably, the polyamides used as component G are aliphatic homo- or copolyamides, especially nylon-12, nylon-4, nylon-4,6, nylon-6, nylon-6,6, nylon-6,9, nylon-6,10, nylon-6,12, nylon-6,66, nylon-7,7, nylon-8,8, nylon-9,9, nylon-10,9, nylon-10,10, nylon-11 or nylon-12. These are known, for example, by the trade names Nylon®, from DuPont, Ultramid®, from BASF, Akulon® K122, from DSM, Zytel® 7301, from DuPont; Durethan® B 29, from Bayer and Grillamid®, from Ems Chemie.

Particularly suitable components G are also compounds based on PA 6, PA 6,6 and other aliphatic homo- or copolyamides in which there are 3 to 11 methylene groups for every polyamide group in the polymer chain.

Preference is given to using, as component G, one or more polyamides selected from the group consisting of PA 6, PA 6,6, PA 4,6, PA 12 and/or PA 6,10.

Particular preference is given to using, as component G, nylon-6,6 or polymer mixtures of nylon-6,6 and nylon-6.

Very particular preference is given to using, as component G, polyamide mixtures consisting to an extent of at least 75% by weight of nylon-6,6 and to an extent of at most 25% by weight of nylon-6.

The polyesters used with particular preference as component G are generally (cyclo)aliphatic or aromatic-aliphatic polyesters which derive from (cyclo)aliphatic and/or aromatic dicarboxylic acids or the polyester-forming derivatives thereof, such as the dialkyl esters or anhydrides thereof, and from (cyclo)aliphatic and/or aralphatic diols or from (cyclo)aliphatic and/or aromatic hydroxycarboxylic acids or the polyester-forming derivatives thereof, such as the alkyl esters or anhydrides thereof. The term "(cyclo)aliphatic" encompasses cycloaliphatic and aliphatic compounds.

Thermoplastic polyesters are preferably selected from the group of the polyalkylene esters of aromatic and/or aliphatic dicarboxylic acids or the dialkyl esters thereof.

Components G used with preference are aromatic-aliphatic thermoplastic polyesters and, among these, preferably thermoplastic polyesters derived by reaction of aromatic dicarboxylic acids or the polyester-forming derivatives thereof with aliphatic $C_2$-$C_{10}$ diols, especially with $C_2$-$C_4$ diols.

Components G used with preference in accordance with the invention are polyalkylene terephthalates, and among these more preferably polyethylene terephthalates or polybutylene terephthalates.

Polyalkylene terephthalates contain preferably at least 80 mol %, especially 90 mol %, based on the dicarboxylic acid, of units derived from terephthalic acid.

The polyalkylene terephthalates used with preference in accordance with the invention as component G may, as well as the terephthalic acid radicals, contain up to 20 mol % of radicals of other aromatic dicarboxylic acids having 8 to 14 carbon atoms or radicals of aliphatic dicarboxylic acids having 4 to 12 carbon atoms, such as radicals of phthalic acid, isophthalic acid, naphthalene-2,6-dicarboxylic acid, 4,4'-diphenyldicarboxylic acid, succinic acid, adipic acid, sebacic acid or azelaic acid, cyclohexanediacetic acid or cyclohexanedicarboxylic acid.

The polyalkylene terephthalates used with preference in accordance with the invention as component G may be branched by incorporation of relatively small amounts of tri- or tetrahydric alcohols or tri- or tetrabasic carboxylic acids, as described, for example, in DE-A 19 00 270. Examples of preferred branching agents are trimesic acid, trimellitic acid, trimethylolethane and -propane and pentaerythritol.

Particularly preferred components G are polyalkylene terephthalates that are prepared solely from terephthalic acid and the reactive derivatives thereof (for example the dialkyl esters thereof) and ethylene glycol and/or propane-1,3-diol and/or butane-1,4-diol (polyethylene terephthalate and polytrimethylene terephthalate and polybutylene terephthalate) and mixtures of these polyalkylene terephthalates.

Preferred polybutylene terephthalates contain at least 80 mol %, preferably 90 mol %, based on the dicarboxylic acid, of terephthalic acid radicals and at least 80 mol %, preferably at least 90 mol %, based on the diol component, of butane-1,4-diol radicals.

The preferred polybutylene terephthalates may additionally contain, as well as butane-1,4-diol radicals, up to 20 mol % of other aliphatic diols having 2 to 12 carbon atoms or cycloaliphatic diols having 6 to 21 carbon atoms, for example radicals of ethylene glycol; propane-1,3-diol, 2-ethylpropane-1,3-diol, neopentyl glycol; pentane-1,5-diol, hexane-1,6-diol, cyclohexane-1,4-dimethanol, 3-methylpentane-2,4-diol; 2-methylpentane-2,4-diol; 2,2,4-trimethylpentane-1,3-diol, 2-ethylhexane-1,3-diol, 2,2-diethylpropane-1,3-diol, hexane-2,5-diol; 1,4-di([beta]-hydroxyethoxy)benzene, 2,2-bis(4-hydroxycyclohexyl)propane; 2,4-dihydroxy-1,1,3,3-tetramethylcyclobutane, 2,2-bis(3-[beta]-hydroxyethoxyphenyl)propane and 2,2-bis(4-hydroxypropoxyphenyl)propane.

Polyalkylene terephthalates used with preference in accordance with the invention as component G are also copolyesters that are prepared from at least two of the abovementioned acid components and/or from at least two of the abovementioned alcohol components and/or butane-1,4-diol.

The thermoplastic polyesters used as component G can also be used in a mixture with other polyesters and/or further polymers.

The polymer compositions of the invention may also comprise further additives as component H. Preferred components H in the context of the present invention are antioxidants, UV stabilizers, gamma ray stabilizers, hydrolysis stabilizers, costabilizers for antioxidants, antistats, emulsifiers, nucleating agents, plasticizers, processing auxiliaries, impact modifiers, dyes or pigments other than components D and E, fillers, reinforcers and/or further flame retardants other than components A, B, C, F and I.

These especially include phosphates, for instance melamine poly(metal phosphates). Preferred metals for this purpose are the elements of main group 2, of main group 3, of transition group 2, of transition group 4 and of transition group VIIIa of the Periodic Table, and also cerium and/or lanthanum.

Melamine poly(metal phosphates) are preferably melamine poly(zinc phosphates), melamine poly(magnesium phosphates) and/or melamine poly(calcium phosphates).

Preference is given to (melamine)$_2$Mg(HPO$_4$)$_2$, (melamine)$_2$Ca(HPO$_4$)$_2$, (melamine)$_2$Zn(HPO4)$_2$, (melamine)$_3$Al(HPO$_4$)$_3$, (melamine)$_2$Mg(P$_2$O$_7$), (melamine)$_2$Ca(P$_2$O$_7$), (melamine)$_2$Zn(P$_2$O$_7$), (melamine)$_3$Al(P$_2$O$_7$)$_{3/2}$.

Preference is given to melamine poly(metal phosphates) that are known as hydrogenphosphato- or pyrophosphato-metalates with complex anions having a tetra- or hexavalent metal atom as coordination site with bidentate hydrogenphosphate or pyrophosphate ligands.

Preference is also given to melamine-intercalated aluminum, zinc or magnesium salts of condensed phosphates, very particular preference to bismelamine zincodiphosphate and/or bismelamine aluminotriphosphate.

Preference is further given to salts of the elements of main group 2, of main group 3, of transition group 2, of transition group 4 and of transition group VIIIa of the Periodic Table and of cerium and/or lanthanum with anions of the oxo acids of the fifth main group (phosphates, pyrophosphates and polyphosphates).

Preference is given to aluminum phosphates, aluminum monophosphates, aluminum orthophosphates (AlPO$_4$), aluminum hydrogenphosphate (Al$_2$(HPO$_4$)$_3$) and/or aluminum dihydrogenphosphate.

Preference is also given to calcium phosphate, zinc phosphate, titanium phosphate and/or iron phosphate.

Preference is given to calcium hydrogenphosphate, calcium hydrogenphosphate dihydrate, magnesium hydrogenphosphate, titanium hydrogenphosphate (TIHC) and/or zinc hydrogenphosphate.

Preference is given to aluminum dihydrogenphosphate, magnesium dihydrogenphosphate, calcium dihydrogenphosphate, zinc dihydrogenphosphate, zinc dihydrogenphosphate dihydrate and/or aluminum dihydrogenphosphate.

Particular preference is given to calcium pyrophosphate, calcium dihydrogenpyrophosphate, magnesium pyrophosphate, zinc pyrophosphate and/or aluminum pyrophosphate.

The aforementioned phosphates and other and similar phosphates are supplied, for example, by J. M. Huber Corporation, USA, as Safire® Products; these include, for instance, the APP Type II, AMPP, MPP, MPyP, PiPyP. PPaz, Safire® 400, Safire® 600, EDAP products inter alia.

Further phosphates are, for example, those mentioned in JP-A-2004204194, DE-A-102007036465 and EP-A-3133112, which are explicitly included among the usable components I. The proportion of component(s) H in the polymer composition of the invention is generally up to 60% by weight, preferably between 10% and 50% by weight, based on the total amount of the polymer composition.

Particular preference is given to polymer compositions of the invention that comprise fillers and/or especially reinforcers, preferably glass fibers. It is also possible to use mixtures of two or more different fillers and/or reinforcers.

The proportion of fillers and/or reinforcers in the polymer composition of the invention is typically 1% to 45% by weight, preferably 20% to 40% by weight.

The further additives H are known per se as additions to polymer compositions and can be used alone or in a mixture or in the form of masterbatches.

Under the action of laser light, the polymer compositions of the invention show marking with high contrast and pronounced edge sharpness.

As well as the excellent optical properties, contrast and edge sharpness, the laser additives D used in accordance with the invention enable rapid marking with high pulse rates and have a large process window based on the laser settings. Via the setting of the laser parameters, it is additionally possible to control the brightness of the marking down to dark-colored markings. Solely via the control of the laser parameters (power, exposure time, focus), highly detailed color halftone images are obtainable.

The polymer composition of the invention is inscribed with a laser by placing the specimen in the beam path of a pulsed laser, preferably of an Nd:YAG laser, $YVO_4$ laser or 1064 nm fiber laser. In addition, inscription is possible with an excimer laser, for example via a mask technique. However, the desired results are also achievable with other conventional laser types having a wavelength in a region of high absorption of the laser additive D used. The marking obtained is determined by the irradiation time (or pulse count in the case of pulsed lasers) and irradiation power of the laser used and the polymer system used. The power of the laser used depends on the particular application and can be easily determined by the person skilled in the art in the individual case.

The laser used generally has a wavelength in the range from 157 nm to 10.6 μm, preferably in the range from 532 nm to 10.6 μm. Examples that should be mentioned here include $CO_2$ lasers (10.6 μm) and Nd:YAG lasers (1064 or 532 nm) or pulsed UV lasers. The excimer lasers have the following wavelengths: $F_2$ excimer laser (157 nm), ArF excimer laser (193 nm), KrCl excimer laser (222 nm), KrF excimer laser (248 nm), XeCl excimer laser (308 nm), XeF excimer laser (351 nm), frequency-multiplied Nd:YAG laser with wavelengths of 355 nm (frequency-tripled) or 265 nm (frequency-quadrupled). Particular preference is given to using Nd:YAG lasers (1064 or 532 nm), $YVO_4$ lasers, 1064 nm fiber lasers or CO2 lasers. The energy densities of the lasers used are generally in the range from 0.3 $mJ/cm^2$ to 50 $J/cm^2$, preferably 0.3 $mJ/cm^2$ to 10 $J/cm^2$. In the case of use of pulsed lasers, the pulse frequency is generally in the range from 1 to 30 kHz. Corresponding lasers are commercially available.

Laser welding is frequently effected by welding a laser-transparent material to a laser-absorbent material. The laser-absorbent material added may be the laser additive D used in accordance with the invention in concentrations of 0.001% to 10% by weight, preferably 0.001% to 7% by weight and especially 0.01% to 3% by weight, based on the laser-absorbing polymer composition. Suitable lasers for laser welding are preferably CW diode lasers or Nd:YAG lasers at wavelengths of 800-1100 nm, preferably of 808-1080 nm. The energy densities of the lasers used are generally in the range from 0.3 $mJ/cm^2$ to 200 $J/cm^2$, preferably 0.5 $J/cm^2$ to 150 $J/cm^2$.

The aforementioned components A, B, C, D and optionally E, F, G, H and/or I may be processed in a wide variety of different combinations to give the additive mixture or polymer composition of the invention. For instance, it is possible, at the start or at the end of the polycondensation or in a subsequent compounding operation, to mix the additive mixture into the polymer melt. In addition, there are processing operations in which individual components are not added until a later stage. This is practiced especially in the case of use of pigment or additive masterbatches. There is also the possibility of applying components, particularly those in pulverulent form, to the polymer pellets, which may be warm as a result of the drying operation, by drum application.

It is also possible to combine two or more of the components of the polymer compositions or additive mixtures of the invention by mixing before they are introduced into the polymer matrix. It is possible here to use conventional mixing units in which the components are mixed in a suitable mixer, for example at 0 to 300° C. for 0.01 to 10 hours.

It is also possible to use two or more of the components of the polymer compositions or additive mixtures of the invention to produce pellets that can then be introduced into the polymer matrix.

For this purpose, two or more components of the polymer composition or additive mixtures of the invention can be processed with pelletizing aids and/or binders in a suitable mixer or a dish pelletizer to give pellets.

The crude product formed at first can be dried in a suitable drier or heat-treated to further increase the grain size.

The polymer composition or additive mixture of the invention or two or more components thereof may, in one embodiment, be produced by roll compaction.

The polymer composition or additive mixture of the invention or two or more components thereof may, in one embodiment, be produced by subjecting the ingredients to mixing, extruding, chopping (and optionally crushing and classifying) and drying (and optionally coating).

The polymer composition or additive mixture of the invention or two or more components thereof may, in one embodiment, be produced by spray granulation.

The polymer composition or additive mixture of the invention is preferably in pellet form, for example in the form of an extrudate or compound. The pelletized material is preferably in cylindrical form with a circular, elliptical or irregular footprint, in bead form, in cushion form, in cube form, in cuboid form or in prism form.

Typical length-to-diameter ratios of the pelletized material are 1:50 to 50:1, preferably 1:5 to 5:1.

The pelletized material preferably has a diameter of 0.5 to 15 mm, more preferably of 2 to 3 mm, and preferably a length of 0.5 to 15 mm, more preferably of 2 to 5 mm.

In the case of use of polymers or precursors thereof that are processed to give thermoset polymer compositions, different production processes may be used.

In one process for producing flame-retardant thermoset compositions, a thermoset resin is mixed with an additive mixture of the invention comprising components A, B, C and D and optionally E and/or F and/or I and optionally with further flame retardants, synergists, stabilizers, additives and fillers or reinforcers, and the resulting mixture is subjected to wet pressing at elevated pressure, for example at pressures of 3 to 10 bar, and at moderate temperatures, for example at temperatures of 20 to 60° C. (cold pressing).

In another process for producing flame-retardant thermoset compositions, a thermoset resin is mixed with an additive mixture of the invention comprising components A, B, C and D and optionally E and/or F and/or I and optionally with further flame retardants, synergists, stabilizers, additives and fillers or reinforcers, and the resulting mixture is subjected to wet pressing at elevated pressure, for example at pressures of 3 to 10 bar, and at elevated temperatures, for example at temperatures of 80 to 150° C. (warm or hot pressing).

The invention also provides moldings produced from the polymer compositions comprising components A, B, C, D and G and optionally components E, F, H and/or I.

The moldings of the invention may be in any desired shape and form. Examples of these are fibers, films or shaped bodies obtainable from the flame-retardant polymer molding compounds of the invention by any desired shaping processes, especially by injection molding or extrusion.

The shaped polymer bodies of the invention can be produced by any desired shaping methods. Examples of these are injection molding, pressing, foam injection molding, internal gas pressure injection molding, blow molding, film casting, calendering, laminating or coating at relatively high temperatures with the molding composition of the invention.

The moldings are preferably injection moldings or extrudates.

The flame-retardant polymer compositions that have been doped in accordance with the invention can be used in all fields where customary welding methods or printing methods have been used to date for inscription or for joining of plastics. For example, it is possible to employ molding compounds, semifinished products and finished products made from the polymer composition of the invention in the electrics, electronics and motor vehicle industries. The identification and inscription of, for example, cables, conduits, decorative strips or functional parts in the heating, ventilation and cooling sector or of switches, plugs, levers and handles consisting of the flame-retardant polymer composition doped in accordance with the invention can be marked with the aid of laser light even at sites that are difficult to access. In addition, the polymer system of the invention can be used in packaging in the foods sector or in the games and toys sector. The markings on packaging are notable in that they are wipe- and scratch-resistant, stable in subsequent sterilization processes, and applicable in a hygienically clean manner in the marking process. Complete label motifs can be permanently applied to the packaging for a multiuse system. In addition, the polymer system of the invention finds use in medical technology, for example in the marking of petri dishes, microtitre plates, single-use syringes, ampules, sample containers, supply hoses and medical collection pouches or reservoir pouches.

A further important field of use for laser inscription is plastic marks for individual identification of animals, called cattle tags or earmarks. Using a barcode system, the information pertinent specifically to the animal is stored. This information can be called up when required with the aid of a scanner. The inscription has to be very long-lasting since the earmarks in some cases remain on the animals over several years.

The invention preferably relates to the use of the polymer compositions of the invention for production of shaped bodies in the form of components for the electrics/electronics sector, especially for parts of printed circuit boards, housings, films, wires, switches, distributors, relays, resistors, capacitors, coils, lamps, diodes, LEDs, transistors, connectors, regulators, memory elements and sensors, in the form of large-area components, especially of housing components for switchgear cabinets and in the form of components of complicated configuration with demanding geometry.

The wall thickness of the shaped bodies of the invention may typically be up to 10 mm. Particularly suitable shaped bodies are those having a wall thickness of less than 1.5 mm, more preferably a wall thickness of less than 1 mm and especially preferably a wall thickness of less than 0.5 mm.

The examples which follow elucidate the invention without restricting it.

1. Components Used

Flame Retardant FM 1 (Component A)

aluminum salt of diethylphosphinic acid prepared in analogy to example 1 of DE 196 07 635 A1

Flame Retardant FM 2 (Components A and B)

aluminum salt of diethylphosphinic acid containing 0.9 mol % of aluminum ethylbutylphosphinate prepared in analogy to example 1 of DE 10 2014 001 222 A1

Flame Retardant FM 3 (Components A, B and C)

aluminum salt of diethylphosphinic acid containing 0.9 mol % of aluminum ethylbutylphosphinate and 0.5 mol % of aluminum ethylphosphonate prepared according to example 3 of U.S. Pat. No. 7,420,007 B2

Flame Retardant FM 4 (Components A, B and C)

aluminum salt of diethylphosphinic acid containing 2.7 mol % of aluminum ethylbutylphosphinate and 0.8 mol % of aluminum ethylphosphonate prepared according to example 4 of U.S. Pat. No. 7,420,007 B2

Flame Retardant FM 5 (Components A, B and C)

aluminum salt of diethylphosphinic acid containing 0.5 mol % of aluminum ethylbutylphosphinate and 0.05 mol % of aluminum ethylphosphonate prepared by the process according to U.S. Pat. No. 7,420,007 B2

Flame Retardant FM 6 (Components A, B and C)

aluminum salt of diethylphosphinic acid containing 10 mol % of aluminum ethylbutylphosphinate and 5 mol % of aluminum ethylphosphonate prepared by the process according to U.S. Pat. No. 7,420,007 B2

Flame Retardant FM 7 (Component F)

aluminum salt of phosphonic acid prepared according to example 1 of DE 102011120218 A1

Flame Retardant FM 8 (Component I)

melamine polyphosphate prepared according to the example of WO 2000/002869 A1

Laser additive L1 (component D): Antimony-doped tin oxide with specific surface area (BET) of 52 $m^2/g$, prepared according to example 1 of DE 102014016286 A1.

Laser Additive L2 (Component D)

Antimony-doped tin oxide with specific surface area (BET) of 38 $m^2/g$, prepared according to example 3 of DE 10 2014 016 286 A1.

Laser Additive L3 (Component D)

ITO nanopowder from Nanoni Materials &Technology with specific surface area (BET) of 20 m$^2$/g, calcined under forming gas at 450° C. and then ground Color Pigment FP (Component E)

organic green color pigment; PV Fast True Green 0001 (Clariant)

Commercial Polymers (Component G)

nylon-6,6 (PA 6,6-GV; melting range of 255-260° C.): Ultramid® A27 (BASF) polybutylene terephthalate (PBT): Ultradur® 4500 (BASF)

Glass Fibers (Component H)

PPG HP 3610 glass fibers, diameter 10 μm, length 4.5 mm (from PPG, NL)

2. Production, Processing and Testing of Flame-Retardant Thermoplastic Molding Compounds 2.1 Polyamide Molding Compounds The additive components were mixed in the ratios specified in the tables and incorporated via the side intake of a twin-screw extruder (Leistritz ZSE 27/44D) into PA 6,6 at temperatures of 260 to 310° C. The glass fibers were added via a second side intake. The homogenized polymer strand was drawn off, cooled in a water bath and then pelletized.

After sufficient drying, the molding compositions were processed to test specimens on an injection molding machine (Arburg 320 C Allrounder) at melt temperatures of 250 to 320° C., and tested and classified for flame retardancy using the UL 94 test (Underwriter Laboratories). As well as the classification, the afterflame time was also reported.

The comparative tracking index of the moldings was determined according to International Electrotechnical Commission Standard IEC-60112/3.

The glow wire flammability index (GWIT index) was determined according to standard IEC-60695-2-12.

The glow wire ignition temperature (GWIT) was determined according to standard IEC-60695-2-13.

In the GWFI test, using three test specimens (for example using plates of geometry 60×60×1.5 mm), with the aid of a glow wire, at temperatures between 550 and 960° C., the maximum temperature at which an afterflame time of 30 seconds is not exceeded and the sample does not give up burning drops is determined. In the GWIT test, in a comparable measurement procedure, the glow wire ignition temperature 25 K higher (30 K higher between 900° C. and 960° C.) than the maximum glow wire temperature that does not lead to ignition in 3 successive tests even during the contact time of the glow wire is reported. Ignition is considered to mean a flame with a burn time of 5 sec.

To study laser markability, plastic plaques having dimensions of 60 mm×90 mm×1.5 mm (W×H×D) were laser-marked with a pulsed YVO$_4$ laser with a wavelength 1064 nm and a maximum output power of 10.5 W. In the creation of the test pattern, speed was varied between 500 and 5000 mm/s, and frequency between 20 and 100 kHz. Filled areas with a line separation of 50 μm or higher were lasered in linear script. The quality of the laser markings made was assessed visually. In this assessment:
1=very defined, true-to-detail linear marking
2=minor imaging errors in the test pattern
3=clear imaging errors in the test pattern All tests in the respective series, unless stated otherwise, were performed under identical conditions (such as temperature programs, screw geometry and injection molding parameters) for comparability.

2.2 Polyester Molding Compounds

The procedure was as for the polyamide molding compounds. The only exception was the incorporation of the additive components into the polymer in the twin-screw extruder at temperatures of 240 to 280° C.

The dried molding compounds were processed to test specimens on the injection molding machine at melt temperatures of 260 to 280° C.

EXAMPLES 1-11 and COMPARATIVE EXAMPLES C1-C5 with PA 6,6

The results of the experiments with PA 6,6 molding compounds are listed in the examples adduced in the table which follows. All amounts are reported as % by weight and are based on the polyamide molding compound including the additives and reinforcers.

TABLE 1

PA 6,6 GF 30 Test results (1-11 inventive; C1-C5 comparisons)

| Example No. | 1a | 1b | 1c | 1d | 1e | 2 | 3 | 4 | 5 | 6 | 7 |
|---|---|---|---|---|---|---|---|---|---|---|---|
| G: Nylon-6,6 | 52.4 | 60.5 | 46.5 | 60.5 | 60.5 | 60.5 | 60.5 | 60.5 | 60.5 | 60.5 | 60.5 |
| H: glass fibers | 30 | 30 | 30 | 30 | 30 | 30 | 30 | 30 | 30 | 30 | 30 |
| A + B + C: FM 3 | 8 | 12 | 16 | 8 | 8 | — | — | — | — | — | — |
| A + B + C: FM 4 | — | — | — | — | — | 8 | 8 | — | — | — | — |
| A + B + C: FM 5 | — | — | — | — | — | — | — | 8 | 8 | — | — |
| A + B + C: FM 6 | — | — | — | — | — | — | — | — | — | 8 | 8 |
| A + B: FM 2 | — | — | — | — | — | — | — | — | — | — | — |
| A: FM 1 | — | — | — | — | — | — | — | — | — | — | — |
| F: FM 7 | — | — | — | — | — | — | — | — | — | — | — |
| I: FM 8 | 9 | 5 | 4 | — | — | — | — | — | — | — | — |
| D: L1 | 0.1 | 1 | 3 | — | — | 1 | — | 1 | — | 1 | — |

TABLE 1-continued

PA 6,6 GF 30 Test results (1-11 inventive; C1-C5 comparisons)

| | | | | | | | | | | | |
|---|---|---|---|---|---|---|---|---|---|---|---|
| D: L2 | — | — | — | 1 | — | — | — | 1 | — | 1 | — |
| D: L3 | — | — | — | — | 1 | — | 1 | — | 1 | — | 1 |
| E: FP | 0.5 | 0.5 | 0.5 | 0.5 | 0.5 | 0.5 | 0.5 | 0.5 | 0.51 | 0.5 | 0.5 |
| UL 94 0.4 mm/time [sec.] | V-0/28 | V-0/28 | V-0/29 | V-0/29 | V-0/28 | V-0/24 | V-0/23 | V-0/42 | V-0/43 | V-0/28 | V-0/29 |
| GWFI [° C.] | 960 | 960 | 960 | 960 | 960 | 960 | 960 | 960 | 960 | 960 | 960 |
| GWIT [° C.] | 800 | 800 | 800 | 800 | 800 | 800 | 800 | 800 | 800 | 800 | 800 |
| CTI [volts] | 600 | 600 | 600 | 600 | 600 | 600 | 600 | 600 | 600 | 600 | 600 |
| Laser markability | 1 | 1 | 1 | 1 | 1 | 1 | 1 | 1 | 1 | 1 | 1 |

| Example No. | 8 | 8a | 9 | 10 | 11 | C1 | C2 | C3 | C4 | C5 |
|---|---|---|---|---|---|---|---|---|---|---|
| G: Nylon-6,6 | 51.48 | 50.5 | 60.5 | 61 | 61 | 60.5 | 60.5 | 60.5 | 60.5 | 56.5 |
| H: glass fibers | 30 | 30 | 30 | 30 | 30 | 30 | 30 | 30 | 30 | 30 |
| A + B + C: FM 3 | — | — | — | — | — | — | — | — | — | — |
| A + B + C: FM 4 | 12 | 15 | 6 | 8 | 8 | — | — | — | — | — |
| A + B + C: FM 5 | — | — | — | — | — | — | — | — | — | — |
| A + B + C: FM 6 | — | — | — | — | — | — | — | — | — | — |
| A + B: FM 2 | — | — | — | — | — | — | — | 8 | 8 | 12 |
| A: FM 1 | — | — | — | — | — | 8 | 8 | — | — | — |
| F: FM 7 | 0.02 | 3 | 2 | — | — | — | — | — | — | — |
| I: FM 8 | 5 | — | — | — | — | — | — | — | — | — |
| D: L1 | 1 | 1 | — | 1 | — | 1 | — | 1 | — | 1 |
| D: L2 | 1 | 1 | — | — | — | — | — | — | — | — |
| D: L3 | — | — | 1 | — | — | — | 1 | — | 1 | — |
| E: FP | 0.5 | 0.5 | 0.5 | — | 0.5 | 0.5 | 0.5 | 0.5 | 0.5 | 0.5 |
| UL 94 0.4 mm/time [sec.] | V-0/18 | V-0/16 | V-0/16 | V-0/26 | V-0/25 | V-0/49 | V-0/51 | V-0/46 | V-0/44 | V-0/38 |
| GWFI [° C.] | 960 | 960 | 960 | 960 | 960 | 960 | 960 | 960 | 960 | 960 |
| GWIT [° C.] | 825 | 825 | 825 | 800 | 800 | 725 | 725 | 750 | 750 | 775 |
| CTI [volts] | 600 | 600 | 600 | 600 | 600 | 500 | 500 | 500 | 500 | 550 |
| Laser markability | 1 | 1 | 1 | 2 | 2 | 1 | 1 | 1 | 1 | 1 |

The inventive polyamide compositions of examples 1 to 11 attain the UL 94 V-0 fire class at 0.4 mm and simultaneously CTI 600 volts, GWFI 960° C. and GWIT 800° 0/825° C. These polyamide compositions have very good laser markability; however, the omission of the dye E in examples 10 and 11 leads to slight defects in the laser marking. The addition of component F in examples 8 and 9 leads to another improvement in flame retardancy, expressed by a reduced afterflame time and an improvement in the GWIT.

The omission of components B and C in comparative examples C1 and C2 resulted not only in a prolonged afterflame time compared to examples 1-11 but also in reduced CTI and GWIT values.

The omission of component C in comparative examples C3 and C4 resulted not only in a prolonged afterflame time compared to examples 1-11 but also likewise in reduced CTI and GWIT values.

In comparative example C5, increasing the concentration of components A and B resulted in an extension of the afterflame time compared to comparative example C4. However, this polyamide composition still showed reduced GWIT and CTI values compared to examples 1 to 11.

EXAMPLES 12-22 and COMPARATIVE EXAMPLES C6-010 with PBT

The results of the experiments with PBT molding compounds are listed in the examples adduced in the table which follows. All amounts are reported as % by weight and are based on the polyester molding compound including the additives and reinforcers.

TABLE 2

PBT GF 30 Test results (12-22 inventive; C6-C10 comparisons)

| Example No. | 12a | 12b | 12c | 13 | 14 | 15 | 16 | 17 | 18 |
|---|---|---|---|---|---|---|---|---|---|
| G: PBT | 56.5 | 56.5 | 56.5 | 56.5 | 56.5 | 56.5 | 56.5 | 56.5 | 56.5 |
| H: glass fibers | 30 | 30 | 30 | 30 | 30 | 30 | 30 | 30 | 30 |
| A + B + C: FM 3 | 12 | 12 | 12 | — | — | — | — | — | — |
| A + B + C: FM 4 | — | — | — | 12 | 12 | — | — | — | — |
| A + B + C: FM 5 | — | — | — | — | — | 12 | 12 | — | — |
| A + B + C: FM 6 | — | — | — | — | — | — | — | 12 | 12 |
| A + B: FM 2 | — | — | — | — | — | — | — | — | — |
| A: FM 1 | — | — | — | — | — | — | — | — | — |
| D: L1 | 1 | — | — | 1 | — | 1 | — | 1 | — |
| D: L2 | — | 1 | — | — | — | — | — | — | — |
| D: L3 | — | — | 1 | — | 1 | — | 1 | — | 1 |
| E: FP | 0.5 | 0.5 | 0.5 | 0.5 | 0.5 | 0.5 | 0.5 | 0.5 | 0.5 |
| F: FM7 | — | — | — | — | — | — | — | — | — |

TABLE 2-continued

PBT GF 30 Test results (12-22 inventive; C6-C10 comparisons)

| | | | | | | | | | |
|---|---|---|---|---|---|---|---|---|---|
| UL 94 0.4 mm/ time [sec.] | V-0/28 | V-0/29 | V-0/23 | V-0/25 | V-027 | V-0/47 | V-0/49 | V-031 | V-0/33 |
| GWFI [° C.] | 960 | 960 | 960 | 960 | 960 | 960 | 960 | 960 | 960 |
| GWIT [° C.] | 775 | 775 | 775 | 775 | 775 | 775 | 775 | 775 | 775 |
| CTI [volts] | 600 | 600 | 600 | 600 | 600 | 600 | 600 | 600 | 600 |
| Laser markability | 1 | 1 | 1 | 1 | 1 | 1 | 1 | 1 | 1 |

| Example No. | 19 | 20 | 21 | 22 | C6 | C7 | C8 | C9 | C10 |
|---|---|---|---|---|---|---|---|---|---|
| G: PBT | 56.5 | 56.5 | 57 | 57 | 56.5 | 56.5 | 56.5 | 56.5 | 56.5 |
| H: glass fibers | 30 | 30 | 30 | 30 | 30 | 30 | 30 | 30 | 30 |
| A + B + C: FM 3 | — | — | — | — | — | — | — | — | — |
| A + B + C: FM 4 | 10 | 10 | 12 | 12 | — | — | — | — | — |
| A + B + C: FM 5 | — | — | — | — | — | — | — | — | — |
| A + B + C: FM 6 | — | — | — | — | — | — | — | — | — |
| A + B: FM 2 | — | — | — | — | — | — | 12 | 12 | 18 |
| A: FM 1 | — | — | — | — | 12 | 12 | — | — | — |
| D: L1 | 1 | — | 1 | — | 1 | — | 1 | — | 1 |
| D: L2 | — | — | — | — | — | — | — | — | — |
| D: L3 | — | 1 | — | 1 | — | — | — | 1 | — |
| E: FP | 0.5 | 0.5 | — | — | — | 1 | 0.5 | 0.5 | 0.5 |
| F: FM7 | 2 | 2 | — | — | — | — | — | — | — |
| UL 94 0.4 mm/ time [sec.] | V-0/14 | V-0/18 | V-026 | V-0/25 | V-0/54 | V-0/52 | V-0/48 | V-0/47 | V-0/43 |
| GWFI [° C.] | 960 | 960 | 960 | 960 | 960 | 960 | 960 | 960 | 960 |
| GWIT [° C.] | 800 | 800 | 775 | 775 | 725 | 725 | 725 | 725 | 750 |
| CTI [volts] | 600 | 600 | 600 | 600 | 500 | 500 | 500 | 500 | 550 |
| Laser markability | 1 | 1 | 2 | 2 | 1 | 1 | 1 | 1 | 1 |

The inventive polyester compositions of examples 12 to 22 attain the UL 94 V-0 fire class at 0.4 mm and simultaneously CTI 600 volts, GWFI 960° C. and GWIT 775° 0/800° C. These polyester compositions have very good laser markability; however, the omission of the dye E in examples 21 and 22 leads to slight defects in the laser marking. The addition of component F in examples 19 and 20 leads to another improvement in flame retardancy, expressed by a reduced afterflame time and an improvement in the GWIT.

The omission of components B and C in comparative examples C6 and C7 resulted not only in a prolonged afterflame time compared to examples 12-22 but also in reduced CTI and GWIT values.

The omission of component C in comparative examples C8 and C9 resulted not only in a prolonged afterflame time compared to examples 12-22 but also likewise in reduced CTI and GWIT values.

In comparative example C10, increasing the concentration of components A and B resulted in an extension of the afterflame time compared to comparative example C9. However, this polyester composition still showed reduced GWIT and CTI values compared to examples 12 to 22.

The invention claimed is:

1. A polymer composition comprising a thermoplastic polymer selected from a polyamide and a polyester, and an additive mixture for plastics comprising:

a phosphinic salt of the formula (I) as component A

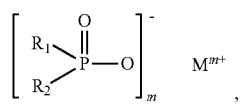

(I)

in which $R_1$ and $R_2$ are ethyl,
M is Al, Fe, $TiO_p$ or Zn,
m is 2 to 3, and $$p=(4-m)/2;$$

a compound selected from the group of the Al, Fe, $TiO_p$ and Zn salts of ethylbutylphosphinic acid, of dibutylphosphinic acid, of ethylhexylphosphinic acid, of butylhexylphosphinic acid and/or of dihexylphosphinic acid as component B;

a phosphonic salt of the formula II as component C

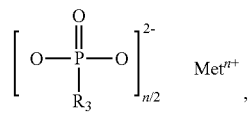

(II)

in which $R_3$ is ethyl,
Met is Al, Fe, $TiO_q$ or Zn,
n is 2 to 3, and $$q=(4-n)/2;$$

antimony- or fluorine-doped tin oxide, indium tin oxide and/or antimony oxide as component D, a colorant as component E, an inorganic phosphonate as component F, and the thermoplastic polymer as component G, wherein, in the polymer composition:

the proportion of component A is 1% to 10% by weight, the proportion of component B is 0.01% to 3% by weight, the proportion of component C is 0.001% to 1% by weight, and the proportion of component D is 0.005% to 2% by weight, the proportion of component F is 0% to 10% by weight, and the proportion of component G is 25% to 95% by weight.

2. The additive mixture as claimed in claim 1, wherein M and Met are Al, m and n are 3, and component B is an aluminum salt.

3. The polymer composition as claimed in claim 1, wherein component D comprises one of antimony-doped tin oxide, fluoride-doped tin oxide and indium tin oxide, wherein the content of dopants in the tin oxide is 1-15 mol %, and the content of tin in the indium tin oxide is 5-15 mol %.

4. The polymer composition as claimed in claim 1, wherein component D is antimony-doped tin oxide containing 0.0001-2.6% by weight of antimony and/or 0.0001-1.5% by weight of tin, or component D is indium tin oxide containing 0.0001-1.5% by weight of indium and/or 0.0001-1.5% by weight of tin, or component D is tin dioxide/ diantimony trioxide-coated mica containing 15-30% by weight of tin and 0.3-2% by weight of antimony, or component D is antimony oxide.

5. The polymer composition as claimed in claim 1, wherein the inorganic phosphonate as component F is a compound of the formula III

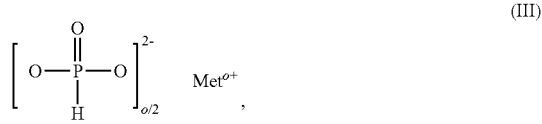

in which Me is Fe, TiO$_r$, Zn or Al, is 2 to 3, and $r=(4-o)/2$.

6. The polymer composition as claimed in claim 1, which comprises a melamine polyphosphate having an average degree of condensation of 2 to 200 as component I.

7. The polymer composition as claimed in claim 6, wherein components A, B and C and optionally F and I are in particulate form, where the median particle size ($d_{50}$) is 1 to 100 μm.

8. The polymer composition as claimed in claim 1, which comprises thermoplastic polymers selected from polyethylene terephthalate, polybutylene terephthalate, poly-1,4-dimethylolcyclohexane terephthalate, nylon-4, nylon-6, nylon-6,6, nylon-6,10, nylon-6,9, nylon-6,12, nylon-4,6, nylon-12,12, nylon-11, nylon-12, nylon-6,66, nylon-7,7, nylon-8,8, nylon-9,9, nylon-10,9, nylon-10,10, and any mixture or copolymer thereof as component G.

9. The polymer composition as claimed in claim 1, which has a comparative tracking index measured by International Electrotechnical Commission Standard IEC-60112/3 of not less than 500 volts.

10. The polymer composition as claimed in claim 1, which attains a V-0 assessment according to UL94 as measured on moldings of thickness 3.2 mm to 0.4 mm.

11. The polymer composition as claimed in claim 1, which has a glow wire flammability index according to IEC-60695-2-12 of not less than 960° C. as measured on moldings of thickness 0.75-3 mm.

12. The polymer composition as claimed in claim 1, which has a glow wire ignition temperature (GWIT) according to IEC-60695-2-13 of at least 775° C.

13. The polymer composition as claimed in claim 1, which comprises further additives as component H, where the further additives are selected from the group consisting of antioxidants, UV stabilizers, gamma ray stabilizers, hydrolysis stabilizers, costabilizers for antioxidants, antistats, emulsifiers, nucleating agents, plasticizers, processing auxiliaries, impact modifiers, dyes or pigments other than components D and E, fillers, reinforcers and/or further flame retardants other than components A, B, C, and F.

14. The polymer composition as claimed in claim 1, which comprises glass fibers.

15. The polymer composition as claim 1 in the form of semifinished products or finished products in the electrics, electronics and motor vehicle industry, in packaging in the foods sector or in the games and toys sector, as label motifs, in medical technology or as plastic marks for individual identification of animals.

16. The polymer composition as claimed in claim 15, in the form of parts of circuit boards, housings, films, conduits, switches, distributors, relays, resistors, capacitors, coils, lamps, diodes, LEDs, transistors, connectors, regulators, storage elements and sensors, in the form of components of large surface area, housing parts for electrical enclosures and in the form of components of complicated configuration with demanding geometry.

* * * * *